May 4, 1965 L. HOCHGRAF 3,182,134

CIRCUIT FOR INTERCONNECTING A NUMBER OF CALLING LINES

Filed Dec. 11, 1959

2 Sheets-Sheet 1

INVENTOR
L. HOCHGRAF
BY
S.E. Hollander
ATTORNEY

CIRCUIT FOR INTERCONNECTING A NUMBER OF CALLING LINES

Filed Dec. 11, 1959 2 Sheets-Sheet 2

INVENTOR
L. HOCHGRAF
BY
S. E. Hollander
ATTORNEY 3,182,134

CIRCUIT FOR INTERCONNECTING A NUMBER OF CALLING LINES

Lester Hochgraf, Madison, N.J., assignor to Bell Telephone Laboratories, Incorporated, New York, N.Y., a corporation of New York Filed Dec. 11, 1959, Ser. No. 858,924
12 Claims. (Cl. 179—18)

Figure 1A:
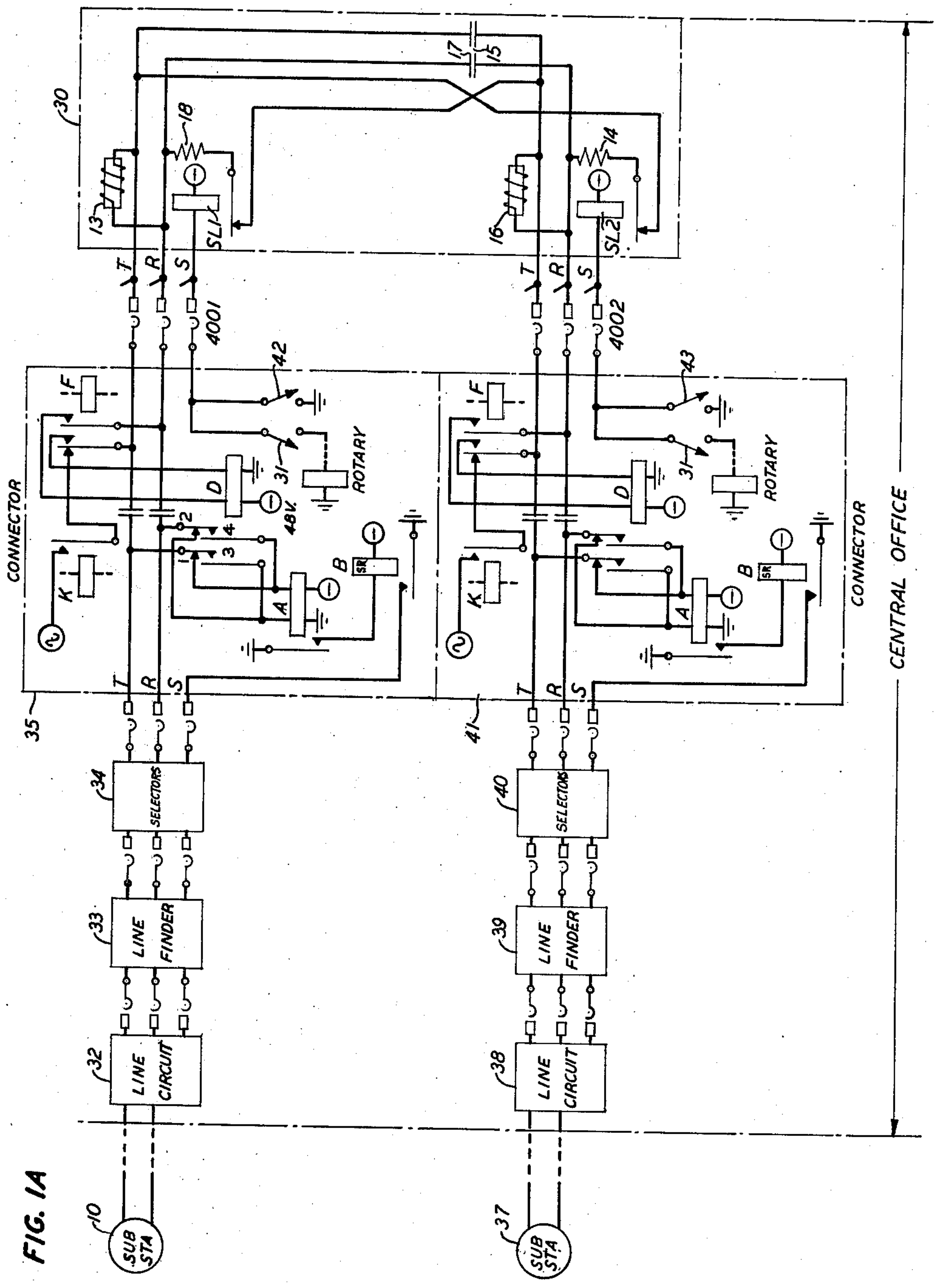

This invention relates to automatic telephone systems and more particularly to arrangements for providing telephone connections between two parties who desire to converse with each other and who are unaware of each other's location.

A common situation which often arises in a larger city or metropolitan area relates to efforts at effecting a telephone connection between two persons who would like to communicate at a specific time, neither of whom is able to definitely predict at what location he will then be. For example, in the case of brokers, buyers and salesmen who find it necessary to conduct their business while moving continually from one location to another, considerable difficulties are experienced in communicating with other salesmen, etc.

Since neither party can predict his location at the time the call is to be consummated, conventional wire telephone facilities have proved largely impotent in coping with this problem. In view of the universal nature of the problem it is to be expected that some effort has already been expended in its resolution. Certain developments in this area, however, have been hampered by a conventional and somewhat prosaic approach. Thus a salesman who sought to effect a communication to a travelling businessman would leave a message with a telephone answering service or other similar facility. Subsequently the person for whom the message was intended could call the same answering service and receive the message. The disadvantages inherent in this type of arrangement are manifold and include a lack of opportunity for confidentially imparting information and more important the inability to effect a two-way telephone conversation.

In short, it is clear that a widespread public need for this type of service has been manifested by the continuing and rapid growth of telephone answering and related services but that the core of the problem has never been squarely met.

It is therefore an object of this invention to provide for effecting telephone connections between two parties who are wholly unaware of the other party's location.

It is another object of this invention to provide telephone communication between individuals who cannot predict at what location they will be at the time the telephone connection is to be consummated.

It is a further object of this invention to provide telephone communication between two calling parties.

At this juncture it is appropriate to observe that a traditional formula of telephone switching is being renounced in the implementation of the instant invention. Heretofore it has generally been accepted that there be at least one calling and one called party. In the present arrangement there is no called party in the recognized sense since both parties will be required to "call."

These and other objects of the invention may be realized in one illustrative embodiment of the invention in which a subscriber who elects to receive the improved services available under this invention is provided in a step-by-step telephone system with two adjacent telephone terminations having successive directory numbers. Their distinctive character resides in the fact that neither of them is a usual telephone termination since neither termination is connected to an actual telephone line outgoing from the central office to a subscriber. Instead, both of the terminations are wholly within the office itself and are interconnected through coupling facilities.

A subscriber who seeks to effect a connection to another party at a prearranged time merely dials the directory number of the first termination and remains connected thereto to await a call by the second party. When the other party dials the same number the termination will be identified as busy and a hunting connector will direct the call to the next adjacent termination which is, as described above, coupled to the first termination. The second calling party is thus connected to the second termination and the two parties may converse for an indefinite period over the facilities which couple the two terminations.

It may be appropriate to appreciate at this point, after a recognition that the twin termination facilities are wholly within the central office, that the present invention absolutely eliminates a problem which heretofore has been of considerable gravity—unauthorized and illegal interference with telephone lines, i.e., "wire-tapping."

Since the termination facilities for the subscriber electing to receive the present service are wholly within the physical confines of the telephone central office building, the problem has been inherently overcome. In view of the fact that the two calling parties may call from any telephone substations including paystations, etc., it is manifest that an attempt to place a permanent "wire-tap" on a calling line in the expectation of monitoring the conversation of the subscriber to the improved services available under the present invention would not be feasible. Moreover, in view of the complete absence of a physical line connected to the termination and departing from the protected confines of the central office the exposure of the line to an unauthorized wire-tap is literally non-existent.

In another illustrative embodiment of the instant invention a subscriber may be provided with coupled adjacent line terminations in the manner described above but for additional convenience and flexibility either one or both of the terminations may be connected to a physical line which extends to a conventional substation on the subscribers' premises. The functioning of this arrangement provides for a timed sequence after the connection of a call to one of the adjacent terminations during which a ringing signal is applied to the subset or subsets on the subscribers' premises. If the subscriber responds to the ringing signal by lifting his receiver and answering the call, the timing sequence is discontinued and a connection is made between the calling and called subscribers in the usual or conventional manner. In this latter embodiment the coupling facilities connecting adjacent terminations are not permanently connected but instead are connectable through the operation of a group of relay contacts.

A similar call made to the directory number representing the adjacent termination results in the same series of events. Under these circumstances the call may be extended over a second line connected to a second substation at the subscribers' premises. The two calling conversations are maintained completely distinct and independent of each other by allowing the cross-coupling facilities between adjacent terminations to remain open.

If, on the other hand, a call had been extended to the first termination and no answer had been made at the substation connected to the first termination, the timer would have completed its sequence and operated to disconnect the calling line from the line extending to the subscriber's substation and transfer the calling line to the cross-coupling facilities or "appointment" circuit. The calling subscriber may then remain connected to the appointment circuit until such time as the party with whom a prearranged conversation has been made calls the same directory number representing the first termination. In this event the first termination is detected as busy and a hunting connector will step the calling connection to the second termination. A similar timing sequence transpires and the second calling line is eventually connected to the appointment circuit at which time the two calling parties may converse. A similar result would have been reached if the second calling party had, instead of dialing the directory number of the first termination, dialed the directory number of the second termination with the exception that the connector need not perform the "hunting" function.

A feature of this invention is an arrangement for interconnecting a number of calling subscribers.

Another feature of this invention is an arrangement for coupling two telephone terminations within a telephone central office to permit communication between two calling subscribers connected thereto.

Still another feature of this invention is an appointment circuit coupling two telephone terminations in a central office from which no physical lines extend to substations.

A further feature of this invention is an arrangement for charging a subscriber effecting a connection to the appointment circuit immediately upon connection thereto.

A further feature of this invention is an arrangement for charging calling parties effecting connections to the appointment circuit only after both parties have been connected.

An additional feature of this invention is an arrangement for providing a subscriber with a conventional telephone line extending from the appointment circuit to the subscribers' premises and for permitting connection to the subscriber line or to the appointment circuit in accordance with a timed sequence.

Figure 1B:
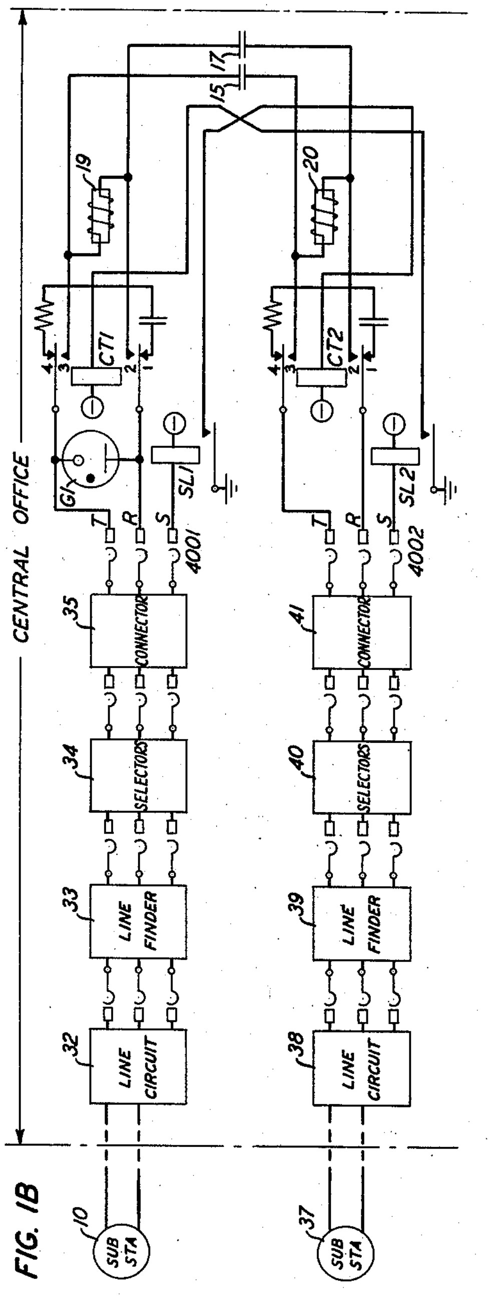
Figure 2:
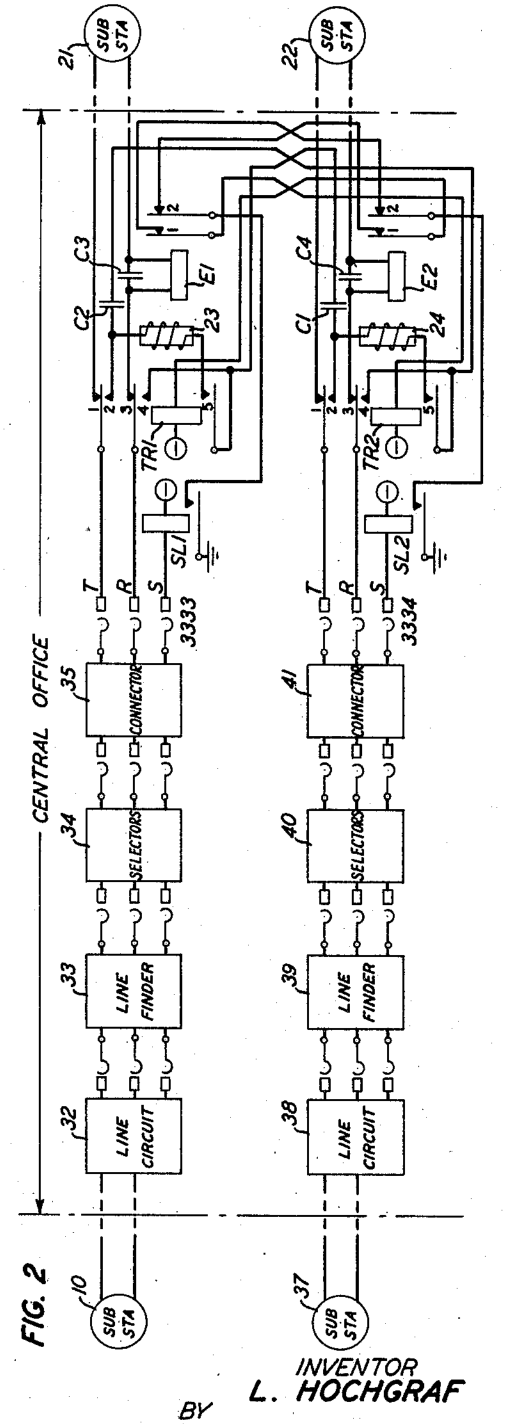

These and other objects and features of the invention may be more readily comprehended from an examination of the following description and attached drawing, in which:

FIG. 1A illustrates an illustrative embodiment of applicant's invention in which a subscriber is provided with two adjacent terminations and a permanently coupled appointment circuit;

FIG. 1B illustrates an arrangement in accordance with FIG. 1A including means for delaying the charging of the calling subscribers until both have effected connections to the appointment circuit; and FIG. 2 illustrates another illustrative embodiment in accordance with applicant's invention wherein physical lines are connected to the adjacent terminations of the appointment circuit and extended to the subscribers' premises.

Referring now to FIG. 1A it will be noted that a substantial portion of the switching chain is depicted in outline form in view of the familiarity of the conventional circuitry therein. In order to simplify the description only those portions of the circuit which are essential to an understanding of the present invention are shown in detail.

In accordance with conventional telephone step-by-step switching systems the subset is shown as connected to a line circuit at a telephone central office which in turn is connectable to a line finder that serves a group of line circuits. The line finder is further connectable to a group of selectors (which may include first and second selectors) and finally to a connector which functions to connect the calling subscriber to the terminal represented by the called directory number. An appointment circuit is shown for effecting connections between two adjacent terminations illustratively designated as terminals 4001 and terminals 4002. The appointment circuit includes cross-coupling capacitors 15 and 17 which join the tip and ring terminals of the adjacent terminations.

It will be readily appreciated by those skilled in the art that in conventional step-by-step systems physical metallic lines would extend from terminals 4001 and 4002 to substations on the premises of telephone customers. In FIG. 1A, however, it is apparent that the appointment circuit 30 coupling the terminals 4001 and 4002 is wholly within the telephone central office. Connectors are shown as connectable to terminals 4001 and 4002, respectively, but it is apparent from the "multiple" designations that the terminals 4001 and 4002 are available to other connectors. The connectors shown are of typical construction and only those portions of the connectors essential to an understanding of the present invention are shown in detail.

In FIG. 1A the connector is or may illustratively be a "hunting" connector such as used for PBX terminations where a plurality of different equipment terminations are all available by dialing a single director number. The hunting capability is shown only symbolically by switch 31 which may be closed to permit the operation of the rotary magnet. When the connector connects to a group of terminals such as terminals 4001 and finds the sleeve lead grounded indicating a busy condition, the rotary magnet is automatically operated one step to transfer the connector to the next adjacent terminals which in this instance will be terminals 4002.

A calling party at subset 10, who has prearranged with another party to effect a connection at a prearranged time, proceeds to consummate the appointment by removing the receiver from any substation in the telephone system (including paystations, etc.) convenient to the location at which the calling party is located at the time of the appointment. The switchhook contacts are closed and operate the usual line relay (not shown) in the line circuit 32 at the central office.

In response to the operation of the line relay, an idle line finder 33 hunts for and connects to the calling line and further connects the calling line through to a first selector 34 which returns dial tone to the calling party. The operations of the line finder and first selector are well known and are explained in detail in Patent No. 2,210,068 of T. L. Dimond of August 6, 1940, and Patent No. 2,225,305 of G. V. King and P. W. Swenson of December 17, 1940, which patents are herewith incorporated by reference.

Thereupon the calling party proceeds to dial the directory number assigned to the individual who contracts for this improved type of communication service. Since it has been assumed that the directory number is (in addition to the exchange code) 4001, the selector 34 (and other selectors, not shown) is activated in response to the digits of the called number as dialed by the calling party to extend the connection to the connector 35.

The connector acts in response to the last two digits 01 of the called directory number to connect to the terminals 4001. The operation of a typical connector is set forth in detail in the text on Automatic Telephony by Smith and Campbell, second edition (1921), pages 55–59.

In the specific illustrative embodiment, when the selector cuts through to the connector, the tip and ring leads of the calling subscriber's line are connected to the winding of relay A over the Nos. 1 and 2 contacts of relay D. Relay A operates over the subscriber's loop and relay B operates through the contacts of relay A. In operating, relay B grounds the sleeve lead S to hold the previous switches in the train operated. Grounding of the sleeve lead also makes the connector test busy to other selectors hunting for an idle connector.

When the dial signals representing the last two digits 01 are received, the circuit through relay A is intermittently opened and closed in accordance with the dial signals. Relay B, however, is a slow release relay and remains operated during the time that relay A is following the dial pulses. Each time relay A releases, a contact thereon is extended to a vertical magnet, not shown, causing the switch to step in a vertical direction to the level corresponding to the next to the last digit dialed. Subsequently the rotary magnet is connected by well-known means, not shown, to the contacts of relay A and the rotary magnet steps horizontally to the terminals 4001 of the appointment circuit.

If the call being made to terminals 4001 is by the first of the parties to call, the terminals will be idle and will be seized by connector 35 in the conventional manner. In accordance with well-known practice the connector will apply a ringing signal to the called line termination. In this particular embodiment the ringing function of course is superfluous since no substation line is permanently connected to terminals 4001. However, to render the illustrative embodiment compatible with existing systems, the connector is permitted to perform the usual ringing function shown symbolically by operation of relay K and the ringing is tripped by retard coil 13 which is designed to have a substantailly high alternating-current impedance and low direct-current impedance. The connector is unable to perceive that in this instance ringing has been tripped by the retard coil 13 instead of the lifting of the receiver at a called substation which is the usual answer condition. In the connector, ringing is tripped in the well-known manner shown symbolically by operation of relay F and relay D operates over the low impedance between the tip and ring terminals presented by the retard coil 13 over the normally open contacts of relay F.

Operation of relay D reverses battery and ground from the windings of relay A over the Nos. 3 and 4 contacts of relay D to the tip and ring conductors of the calling subscriber's line. This reverse current signal is utilized conventionally to provide a charge indication for the substation from which the first party is calling.

The first calling party may now remain connected to line terminals 4001 indefinitely and until the second calling party with whom the appointment has been effected is connected to the appointment circuit. Resistor 14 and condenser 15 provide an idle circuit termination across the tip and ring conductors which benefit the transmission characteristics of the line during the waiting period.

If the second calling party has been advised to dial the directory number 4002, a circuit is established from the subset 37 at which the second calling party is initiating the call through line circuit 38, line finder 39, selector 40 and connector 41 to terminals 4002 in a manner completely analogous to that described above for the first calling subscriber.

It will be noted that relay SL1 was operated when ground was placed on the sleeve lead S of terminals 4001 in accordance with conventional practice by the selector. This arrangement is shown symbolically by the operation of switch 42. Similarly when connector 41 seizes terminals 4002, relay SL2 is operated when the connector applies ground to the sleeve lead S at switch 43. Under these circumstances the idle circuit terminations are removed and the calling party at subset 10 and the calling party at subset 37 are connected over the two switching trains and further over the coupling capacitors 15 and 17 between the tip and ring terminals of terminals 4001 and the tip and ring terminals of terminals 4002. It will be noted that an additional idle circuit termination is provided for terminals 4002 by resistor 18.

If, on the other hand, it is assumed that the calling party at subset 37 was advised to call directory number 4001 in order to connect to the appointment circuit, the switching train including line circuit 38, line finder 39, selector 40 and connector 41 will be extended conventionally in response to the dial signals and connector 41 will test the sleeve lead of terminals 4001 in the usual manner. Since terminals 4002 are occupied by the call originated by the first calling party, connector 41 will detect the ground applied to the sleeve terminal at terminals 4001 by switch 42, and if switch 31 (symbolizing the hunting function) is closed, the connector will automatically advance an additional step in the horizontal direction in view of the operation of the rotary magnet. For an illustration of a typical hunting procedure reference may be made to Patent No. 2,660,619 of Kessler, issued November 24, 1953, and to "Automatic Telephone Practice," by Hershey (1949), §404(*d*) et seq.

Since the next adjacent terminals are terminals 4002 the calling subscriber is connected to the appointment circuit at terminals 4002 and ringing is tripped by retard coil 16 in a manner similar to that described above for retard coil 13. The operation of relay D in connector 41 reverses battery to the called party at subset 37 as a charge indication.

Relay SL2 operates in the manner described above for the operation of relay SL1 to remove the idle circuit termination. A direct tip and ring connection between the two calling parties is now in effect through condensers 15 and 17 and the two parties may converse indefinitely. Other callers seeking either of the two numbers will encounter a busy condition on the sleeve terminals of both and cannot interfere with the circuit.

Each connection is held under control of its own calling line. When either calling subscriber disconnects the respective relays A and B of the connectors 35 and 41 release and the release of relay B removes the ground condition for all previously operated switches in the train permitting them to release. If the first calling party connected to terminals 4001 releases prior to the second calling partly the release of relay SL1 connects idle circuit terminations 17 and 18 across the tip and ring conductors of the trunk connected to terminals 4002.

FIG. 1B discloses an illustrative embodiment of applicant's invention which is similar to that of FIG. 1A with the exception that the circuit has been arranged to insure that the battery of the calling party on either line is not reversed and thus no charge is made until both parties have been connected to the appointment circuit. Thus if a call is made to terminals 4001 in the manner described above ringing is tripped in the connector 35 which has seized terminals 4001 by the breakdown of gas tube G1 in lieu of retard coil 13 of FIG. 1A. Gas tube G1 presents a low impedance path to the high voltage ringing current thereby tripping ringing. Relay SL1 is operated when ground is connected by the connector to the sleeve lead to mark the line as busy in the manner described above. Relay CT2 is operated in series with the contacts of relay SL1.

When the second calling party dials terminals 4002 the connection is extended in the manner described above until such time as the connector seizes terminals 4002. Relay SL2 is operated by the ground condition applied at switch 43 of connector 41 and relay CT1 operates in series with the contacts of relay SL2. At this time a circuit has been established through the tip and ring terminals of terminals 4001 and 4002 and the Nos. 2 and 3 contacts of relays CT1 and CT2 to retard coils 19 and 20 which latter cause relays D in connectors 35 and 41 to be operated and thereby reverse the battery polarity to both calling parties. It will be noted that a circuit through gas tube G1 which was adequate to trip the relatively high voltage ringing was not adapted to operate relay D in view of the considerable voltage drop across the gas tube and the relatively lower potential source (48 v.) connected to the winding of relay D. In operation, gas tube G1 will be deenergized as soon as the high voltage ringing current is tripped. A typical gas tube suitable for use in this regard is the Western Electric type 313.

Release of the circuit may again illustratively be under control of both calling parties individually as described for the embodiment of FIGURE 1A.

In FIG. 2 another illustrative embodiment of the invention is shown in which a subscriber electing to have an appointment circuit may have still further flexibility and convenience through the connection of physical outgoing lines from the line circuit terminals 3333 and 3334 in the central office to subsets 21 and 22 located on the subscribers' premises.

The range of possible operation in accordance with the circuitry of FIG. 2 includes appointment circuit operation through which two calling parties at substations 10 and 37 again representing any substations in the telephone system may be connected, a conventional telephone connection between a calling party at substation 10 and the called subscriber at substation 21, a conventional connection between a subscriber at substation 37 and a subscriber at substation 22 and similar outgoing connections between substation 21 and substation 10 or any other substation and also substation 22 and substation 37 or any other substation. Moreover, a subscriber at substation 10 may be connected to the appointment circuit connected to terminals 3333 and remain waiting on the appointment circuit while a connection is set up and during the course of a conversation between a subscriber at substation 37 and substation 22.

The added range of functions possible in the circuitry of FIG. 2 derives in part from the inclusion of timing relays TR1 and TR2 which are designed to time out and connect a calling party to the appointment circuit if the subscriber does not answer an incoming call at subsets 21 and 22 within a predetermined period.

*Calling subscriber dials directory number of appointment circuit—subscriber at subset 21 answers*

As a first illustration it will be assumed that a subscriber at substation 10 dials the directory number assigned to subset 21 which is illustratively assumed to be 3333 and that the subset 21 is idle, and that line terminals 3333 are idle. The calling party dials the directory number 3333 conventionally and is extended to terminals 3333 which are seized by connector 35 in the manner described above. Relay SL1 operates also in the manner described above and closes a path for the operation of timing relay TR1 over a circuit from ground at the contacts of relay SL1, No. 2 contacts of relay E1, No. 1 contacts of relay E2 to the operating winding of relay TR1. Timing relay TR1 is energized but does not operate until a predetermined time period has elapsed. At this time the connection is extended over the tip and ring terminals of terminals 3333 to subset 21 over the Nos. 1 and 3 contacts of relay TR1. When the subscriber at subset 21 lifts his receiver, ringing is tripped over the low impedance path of the subset in the off-hook condition and a direct connection is now available from the calling subscriber to subset 21. Current flowing through relay E1 in series with the ring conductor opens the circuit to timing relay TR1 at the No. 2 contacts of relay E1 and timing relay TR1 is adapted to automatically reset. Conversation may now ensue indefinitely between the calling subscriber at subset 10 and the called subscriber at subset 21.

*Call to appointment circuit—busy condition at subset 21*

If, during the period of conversation between the subscriber at subset 10 and that at subset 21, an additional call is made to terminals 3333, the call will be advanced in the manner described above by the hunting connector to line terminals 3334. Similarly, if a call is made directly to terminals 3334, the connection is extended without hunting also as described above. If this line is not busy as indicated by non-operation of relay SL2, ringing begins on the line connected to subset 22 and may be answered by the called subscriber. If the second line is not answered, however, timer TR2 will nonetheless be unable to operate in view of the open circuit at the No. 1 contacts of relay E1 in series therewith and ringing is continued until the calling subscriber hangs up. Thus no connection can be made to the appointment circuit if subset 21 is off-hook. It will likewise be apparent that no connection may be made to the appointment circuit if subset 22 is off-hook in view of the contacts of relay E2 in series with timer TR1.

*Calling party dials appointment circuit number—no answer at subset 21*

It will now be assumed that the calling subscriber at subset 10 dials the directory number 3333 and is connected to line terminals 3333 and ringing has been applied to subset 21 over the physical line extending to the subscribers' premises but no answer is made, that is, the switchhook contacts at subset 21 remain on-hook, under these conditions timing relay TR1 will eventually time out, operate and transfer the tip and ring conductors of the connector over the Nos. 2 and 4 contacts of relay TR1 to the appointment circuit. Retard coil 23 will now trip ringing to subset 21 over the No. 5 contacts of relay TR1 in the manner described above with respect to FIG. 1A.

If subsequently another call is made to terminals 3334 when the first calling party is waiting and connected to the appointment circuit, the connector will be extended to terminals 3334 and ringing will begin on the second line connected to subset 22. If ringing at subset 22 is answered, ringing will be tripped and conversation may ensue between a calling party at substation 37 and the called party at subset 22 at which time the calling party at subset 10 already connected to the appointment circuit will remain waiting.

If, however, an appointment is by prearrangement to be effected and the second line is not answered, timer TR2 will ultimately operate from ground at relay SL2, No. 2 contacts of relay E2 and the No. 1 contacts of relay E1 and transfer the incoming call from subset 37 over the Nos. 2 and 4 contacts of relay TR2 to the appointment circuit. Retard coil 24 will now trip ringing to subset 22 and cause battery to be reversed on the trunk connected to terminals 3334. The calling parties connected to the appointment circuit may now converse indefinitely through condensers C1 and C2.

When either party disconnects, the circuit is cleared on those terminals in the manner described above and the timing relay is permitted to reset.

It is significant to observe the inherent security features of the circuit which, through the relays E1 and E2 prevents an appointment connection to a line when the line is being used to make an outgoing call. When relay E1, for example, is operated, neither timing relay can operate and an incoming call cannot be bridged across the connection.

It is understood that the above embodiments are merely illustrative and that various modifications may be made by those skilled in the art without departing from the spirit and scope of the invention. For example, relays TR1 and TR2 which have been described as acting on the basis of a given time interval can be replaced by counting devices which operate directly on the ringing signals applied to the lines connected to subsets 21 and 22 and perform the described actions after a predetermined number of spurts of ringing signal have been applied to the lines connected to subset 21 or 22, if the switchhooks at subset 21 or 22 are not lifted before the expiration of the predetermined number of ringing spurts. Moreover, although a step-by-step switching system is depicted, it is understood that other types of systems may be utilized in conjunction with the present invention.

What is claimed is:

1. An automatic telephone system for interconnecting a plurality of calling lines including a first group of terminals having a first number designation, a second group of terminals having a second number designation, connecting means permanently coupling said terminals to permit communication therebetween, means responsive to an idle condition on said first group of terminals and the transmission of signals representing said first number designation for connecting a calling line to said first terminals, means for applying ringing current to said first terminals, impedance means connected to said terminals and adapted to present a relatively low impedance to direct-current signals and a relatively high impedance to alternating-current signals for tripping said ringing means, and means responsive to the tripping of said ringing means for transmitting a signal to said calling line representing a revenue charge indication.

2. An automatic telephone switching system in accordance with claim 1 including in addition impedance means connected to said second group of terminals and adapted to present a high impedance to alternating-current signals and a low impedance to direct-current signals, means responsive to an idle condition on said second group of terminals and the transmission of signals representing said second number designation for connecting a second calling line to said second terminals, means for applying ringing current to said second terminals, said impedance means being adapted to trip said ringing means, and means responsive to the tripping of said ringing means for transmitting a signal over said second calling line representing a revenue charge indication.

3. A telephone switching system for interconnecting calling subscribers including a first group of terminals having a first number designation, a second group of terminals having a second number designation, connecting means permanently coupling said terminals to permit communication therebetween, means connectable to said first group of terminals and responsive to signals representing said first number designation for connecting a calling line to said first terminals, ringing means for applying ringing current to said first terminals, asymmetrically conducting marginally operative means connected to said terminals and adapted to deenergize said ringing means, means connectable to said second group of terminals and responsive to signals indicative of said second number designation for connecting a second calling line to said second terminals, and impedance means connected to said terminals and responsive to the joint connection of said first calling line to said first group of terminals and said second calling line to said second group of terminals for transmitting a revenue charge indication over both of said calling lines simultaneously.

4. A telephone switching system for interconnecting calling subscribers in accordance with claim 3 wherein said impedance means includes inductive impedance means adapted to present a relatively low impedance to direct-current signals and a relatively higher impedance to alternating-current signals.

5. A telephone switching system for interconnecting calling subscribers including a first bank of contacts having a first number designation, a second bank of contacts having a second number designation, a first substation line connected to said first bank of contacts, a second substation line connected to said second bank of contacts, means connectable to said first bank of contacts and responsive to signals representing said firt number designation for connecting a calling line to said first bank of contacts, means responsive to the connection of said first calling line to said first bank for applying ringing current to said first bank of contacts and to said first substation line, first timing means connected to said first bank of contacts and responsive to the lapse of a predetermined period of time for terminating said ringing current, and an appointment circuit for coupling said first and second bank of contacts to permit communication therebetween, said timing means being adapted to transfer said first calling line after said predetermined period of time to said appointment circuit.

6. A telephone switching system in accordance with claim 5 including in addition means connectable to said second bank of contacts and responsive to signals representing said second number designation for connecting a calling line to said second bank, means responsive to the connection of said second calling line to said second bank to apply ringing current to said second bank and to said second substation, second timing means connected to said second bank and responsive to the lapse of a predetermined period of time for terminating said ringing current and for connecting said second calling line to said appointment circuit to permit communication between said first and second calling line.

7. A telephone switching system in accordance with claim 5 including in addition means responsive to the actuation of said first timing means for disconnecting said first bank of contacts from said first substation.

8. A telephone switching system in accordance with claim 5 including in addition means responsive to an answer condition at said first substation to terminate said ringing current and to deenergize said first timing means.

9. A telephone switching system in accordance with claim 6 including in addition means responsive to the operation of said second timing means for disconnecting said second substation from said second bank of contacts.

10. A telephone switching system in accordance with claim 6 including in addition means responsive to an answer condition at said second substation to terminate said ringing current and to deenergize said second timing means.

11. A telephone switching system including a first group of terminals having a first number designation, a second group of terminals having a second number designation, an appointment circuit connected to said terminals to permit communication therebetween, a first substation connected to said first group of terminals, a second substation connected to a second group of terminals, means connectable to said terminals and responsive to signals representing said first number designation for connecting a first calling line to said first terminals, ringing means responsive to the connection of said first calling line to said first terminals to apply ringing current to said first substation, additional means connectable to said first group of terminals and responsive to an answer condition at said first substation for de-energizing said ringing means and for thereafter preventing a connection over a second calling line to said appointment circuit, means connectable to said second group of terminals and responsive to said second number designation for connecting a calling line to said second group of terminals, ringing means responsive to the connection of said second calling line to said second group of terminals for applying ringing current to said second substation, and additional means connected to said second group of terminals and responsive to an answer condition at said second substation for de-energizing said ringing means.

12. An automatic telephone switching system in accordance with claim 11 including in addition means responsive to an off-hook condition at either substation for preventing a connection to said appointment circuit.

References Cited by the Examiner

UNITED STATES PATENTS

| | | | |
|---|---|---|---|
| 2,172,947 | 9/39 | Taylor | 179—18 |
| 2,831,065 | 4/58 | Armstrong | 179—18 |
| 2,892,038 | 6/59 | Gatzert | 179—27 |

ROBERT H. ROSE, *Primary Examiner.*

L. MILLER ANDRUS, THOMAS B. HABECKER, WILLIAM C. COOPER, *Examiners.*